US007736610B2

(12) United States Patent
Meikrantz et al.

(10) Patent No.: US 7,736,610 B2
(45) Date of Patent: *Jun. 15, 2010

(54) ACTINIUM RADIOISOTOPE PRODUCTS OF ENHANCED PURITY

(75) Inventors: David Herbert Meikrantz, Idaho Falls, ID (US); Terry Allen Todd, Aberdeen, ID (US); Troy Joseph Tranter, Idaho Falls, ID (US); E. Philip Horwitz, Naperville, IL (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 871 days.

This patent is subject to a terminal disclaimer.

(21) Appl. No.: 11/278,522

(22) Filed: Apr. 3, 2006

(65) Prior Publication Data

US 2006/0213329 A1    Sep. 28, 2006

Related U.S. Application Data

(63) Continuation-in-part of application No. 10/949,675, filed on Sep. 24, 2004, now Pat. No. 7,157,061.

(51) Int. Cl.
*C01G 56/00* (2006.01)
(52) U.S. Cl. ............................ 423/249; 423/3; 424/1.11
(58) Field of Classification Search ................ 423/8, 423/9, 10, 3, 249; 75/393; 376/189, 170, 376/125, 195; 424/1.11
See application file for complete search history.

(56) References Cited

U.S. PATENT DOCUMENTS

| 4,959,158 | A | 9/1990 | Meikrantz |
| 5,156,824 | A | 10/1992 | Blanquet et al. |
| 5,246,691 | A | 9/1993 | Geerlings et al. |
| 5,355,394 | A | 10/1994 | van Geel et al. |
| 5,571,070 | A | 11/1996 | Meikrantz et al. |
| 5,591,340 | A | 1/1997 | Meikrantz et al. |
| 5,682,593 | A | 10/1997 | Holzner et al. |
| 5,702,608 | A | 12/1997 | Foos et al. |
| 5,809,394 | A | 9/1998 | Bray et al. |
| 5,854,968 | A | 12/1998 | Horwitz et al. |
| 5,885,465 | A | 3/1999 | Bray et al. |
| 6,299,666 | B1 | 10/2001 | Apostolidis et al. |
| 6,468,445 | B2 | 10/2002 | Romanovskiy et al. |
| 6,603,127 | B1 | 8/2003 | Scheinberg et al. |
| 6,680,993 | B2 | 1/2004 | Satz et al. |
| 7,087,206 | B2 | 8/2006 | Bond et al. |
| 7,157,061 | B2 * | 1/2007 | Meikrantz et al. .............. 423/2 |

| 2003/0127395 | A1 | 7/2003 | Bond et al. |
| 2003/0194364 | A1 | 10/2003 | Bond et al. |
| 2004/0052705 | A1 | 3/2004 | Tranter et al. |
| 2004/0062695 | A1 | 4/2004 | Horwitz et al. |
| 2004/0254419 | A1 | 12/2004 | Wang et al. |

OTHER PUBLICATIONS

Benedict, Glen E., "Improvements in Thorium-Uranium Separation in the Acid-Thorex Process," ACS Symposium Series #117, American Chemical Society, Washington, D.C. 1980; p. 371.
Dietz et al., "An improved extraction chromatographic resin for the separation of uranium from acidic nitrate media," Talanta 54:1173 1184 (2001).
Grant, G. R., et al.,"Heavy Element Separation for Thorium Uranium-Plutonium Fuels," ACS Symposium Series #117, American Chemical Society, Washington, D.C. 1980; p. 351.
Horwitz et al. "The Extraction of DBP and MBP from Actinides: Application to the Recovery of Actinides from TBP-Sodium Carbonate Scrub Solutions," American Chemical Society pp. 475-496 (1980).
Horwitz et al., "New Extraction Chromatographic Resins for the Recovery of TRUs and Lanthanides from Acidic Nitrate and Chloride Wastes," 227$^{th}$ ACS National Meeting, 10 pages, Mar. 2004.
Mason, G.W., Griffin, H.E., "Demonstration of the Potential for Designing Extractants with Preselected Extraction Properties; Possible Application to Reactor Fuel Reprocessing," ACS Symposium Series #117, American Chemical Society, Washington, D.C. 1980; p. 89.
Boll et al., "Production of actinium-225 for alpha particle mediated radioimmunotherapy," Applied Radiation and Isotopes 62: 667—679 (2005).
Horwitz et al, "Novel Extraction of Chromatographic Resins Based on Tetraalkyldiglycolamides: Characterization and Potential Applications," Solvent Extraction and Ion Exchange 23: 319-344 (2005).

* cited by examiner

*Primary Examiner*—Steven Bos
(74) *Attorney, Agent, or Firm*—TraskBritt

(57) ABSTRACT

A product includes actinium-225 ($^{225}$Ac) and less than about 1 microgram (μg) of iron (Fe) per millicurie (mCi) of actinium-225. The product may have a radioisotopic purity of greater than about 99.99 atomic percent (at %) actinium-225 and daughter isotopes of actinium-225, and may be formed by a method that includes providing a radioisotope mixture solution comprising at least one of uranium-233 ($^{233}$U) and thorium-229 ($^{229}$Th), extracting the at least one of uranium-233 and thorium-229 into an organic phase, substantially continuously contacting the organic phase with an aqueous phase, substantially continuously extracting actinium-225 into the aqueous phase, and purifying the actinium-225 from the aqueous phase. In some embodiments, the product may include less than about 1 nanogram (ng) of iron per millicurie (mCi) of actinium-225, and may include less than about 1 microgram (μg) each of magnesium (Mg), Chromium (Cr), and manganese (Mn) per millicurie (mCi) of actinium-225.

17 Claims, 4 Drawing Sheets

US 7,736,610 B2

ACTINIUM RADIOISOTOPE PRODUCTS OF ENHANCED PURITY

CROSS-REFERENCE TO RELATED APPLICATION

This application is a continuation-in-part of U.S. patent application Ser. No. 10/949,675, filed Sep. 24, 2004, now U.S. Pat. No. 7,157,061, issued Jan. 2, 2007, and entitled PROCESS FOR RADIOISOTOPE RECOVERY AND SYSTEM FOR IMPLEMENTING SAME.

GOVERNMENT RIGHTS

This invention was made with government support under Contract No. DE-AC07-99ID13727 and Contract No. DE-AC07-05ID14517 awarded by the U.S. Department of Energy. The government has certain rights in the invention.

FIELD OF THE INVENTION

The present invention relates to a method of recovering radioisotopes. More specifically, the present invention relates to an extraction method for recovering radioisotopes from breeder reactor fuel.

BACKGROUND OF THE INVENTION

In the medical field, numerous radioisotopes are used for diagnostics and for treating various forms of cancer. Radioisotopes that are capable of emitting alpha particles, such as radium-223, actinium-225 ("Ac-225"), and bismuth-213 ("Bi-213"), are particularly advantageous in treating cancers because they provide highly ionizing radiation that does not penetrate far from the radioisotope. If the alpha emitter is placed near a tumor site or cancer cell, its effects are localized to those sites without significantly affecting healthy, surrounding tissue. For instance, Bi-213 decays via a daughter isotope, polonium-213 ("Po-213"), producing alpha emissions that have an extremely high energy of about 8.4 MeV. Research and clinical trials for using Bi-213 labeled monoclonal antibodies as cancer therapy tools have been ongoing for at least a decade. While alpha emitters have shown effectiveness in treating cancers, these radioisotopes are often generated in small quantities and must be separated from other radioisotopes that are present in source materials.

One potential source of Bi-213 is from Ac-225, which is a decay product of thorium-229 ("Th-229"). Th-229 is a daughter isotope of uranium-233 ("U-233"), stockpiles of which remain from nuclear power plant reactors and nuclear weapons programs. However, in order to generate sufficient quantities of the Bi-213, the Ac-225 and Bi-213 must be easily, economically, and safely removed from other radioisotopes and non-isotope impurities in the U-233 stockpiles. For instance, the Ac-225 must be easily separated from Th-229 and U-233. However, the nuclear stockpiles at various nuclear storage facilities in the United States, such as Oak Ridge National Laboratory ("ORNL") or Idaho National Engineering and Environmental Laboratory ("INEEL"), are composed of different radioisotopes or matrices. Therefore, different separation methods are needed to separate and purify the Ac-225 and Bi-213 from each of the different nuclear stockpiles.

Various methods, such as precipitation or chromatographic methods, have been disclosed to isolate Ac-225 and Bi-213 from radioactive source materials. In published United States Patent Application 2004/0052705 to Tranter et al. ("Tranter"), which is assigned to the same assignee as the present invention, a precipitation process for recovering an Ac-225/Bi-213 product from a thorium source material is disclosed. A solution that includes a first volume of nitric acid and at least some of the thorium source material is provided. Iodate is added to the solution and at least some of the iodate combines with the thorium to form a thorium iodate precipitate. A supernatant containing at least some of the first volume of nitric acid is separated from the thorium iodate precipitate and a second volume of nitric acid is added to the thorium iodate precipitate. The precipitate is stored in the second volume of nitric acid for a generation time period during which a thorium-229 decay product comprising Ac-225 and Bi-213 is generated. The second volume of nitric acid containing at least some of the Th-229 decay product is separated from the thorium iodate precipitate and is filtered to remove at least some of any residual thorium iodate precipitate present. After filtering, the second volume of nitric acid is treated using at least one chromatographic procedure to separate Ac-225 and Bi-213 from at least some of any impurities that are present in the second volume of nitric acid.

In published United States Patent Application 2004/0062695 to Horwitz et al., the disclosure of which is incorporated by reference herein, a separation medium having a diglycolamide ("DGA") extractant dispersed onto an inert, porous support is disclosed. The separation medium is used to selectively extract multivalent cations, such as scandium(III), yttrium(III), lanthanum(III), actinium(III), trivalent americium, trivalent yttrium, and trivalent ytterbium, from an acidic, aqueous solution.

In U.S. Pat. No. 5,854,968 to Horwitz et al., the disclosure of which is incorporated by reference herein, Bi-213 cations are isolated chromatographically from an aqueous feed solution produced from the decay products of U-233. To isolate the Bi-213, Ac-225 is first isolated from the aqueous feed solution by ion exchange chromatography. The aqueous feed solution is contacted with a first ion exchange medium to separate the Ac-225 from the aqueous feed solution. The first ion exchange medium is a TEVA™ resin, which is a tetravalent actinide resin having a quaternary ammonium salt sorbed on a water-insoluble support. A solution having the Ac-225 is then exposed to a second ion exchange medium to bind the Ac-225. The second ion exchange medium includes diphosphonic acid ("DPA") groups sorbed onto an inert substrate and is known as DIPEX®. The second ion exchange medium, having the bound Ac-225, is maintained for a sufficient amount of time for the Ac-225 to decay to Bi-213, which is then eluted from the second ion exchange medium.

In published United States Patent Application Publication 2003/0194364 to Bond et al., a multicolumn method of obtaining purified Ac-225 is disclosed. The Ac-225 is separated from a thorium source material using a primary separation column. The primary separation column is a strong acid cation exchange resin. The Ac-225 is retained by the primary separation column while the thorium elutes. The Ac-225 is removed from the primary separation column and passed through a guard column. The guard column is a UTEVA® or UTEVA®-2 resin, a TEVA™ resin, an anion exchange resin, or 2-ethylhexyl-2-ethylhexylphosphonic acid on an inert substrate. The guard column retains additional amounts of thorium that are present while the Ac-225 elutes.

U.S. Pat. No. 5,809,394 to Bray et al. discloses a method of removing plutonium, cobalt, copper, lead, or other cationic impurities from a mixture of radionuclides, such as actinium-227 or thorium-229. The cationic impurities are removed by acidifying the mixture, oxidizing the mixture, and passing the oxidized mixture through an anion exchange column. The purified radionuclides are used as a source for alpha emitters, such as radium-223 and Ac-225.

Liquid-liquid extraction methods for extracting uranium and thorium are also known in the art. For instance, the Acid-Thorex process is known to separate thorium and U-233. The Acid-Thorex process utilizes n-tributyl phosphate ("TBP") in normal paraffin hydrocarbon as the extractant. In Mason et al., chapter 7, "Demonstration of the Potential for Designing Extractants with Preselected Extraction Properties: Possible Application to Reactor Fuel Reprocessing," ACS Symposium Series No. 117, American Chemical Society, Washington, D.C., pp. 89-98 (1980), a liquid-liquid extraction method of separating U(VI) and Th(IV) is disclosed. The liquid-liquid extraction uses neutral or monoacidic, phosphorus-based organic compounds as the extractants. In Benedict, chapter 26, "Improvements in Thorium-Uranium Separation in the Acid-Thorex Process," ACS Symposium Series No. 117, American Chemical Society, Washington, D.C., pp. 371-377 (1980), dibutyl phosphate ("DBP") and low concentrations of fluoride ions are disclosed for use with the Acid-Thorex process. In Grant et al., chapter 25, "Heavy Element Separation for Thorium-Uranium-Plutonium Fuels," ACS Symposium Series No. 117, American Chemical Society, Washington, D.C., pp. 351-369 (1980), TBP is used to separate Th, U-233, and plutonium from one another using a modified Thorex solvent extraction that includes 30% TBP.

Chromatographic methods have also been used to separate uranium from acidic media. In Dietz et al., "An improved extraction chromatographic resin for the separation of uranium from acidic nitrate media," Talanta 54:1173-1184 (2001), an extraction chromatographic resin is disclosed to selectively retain U(VI) over other cations, such as Fe(III), from nuclear waste samples. The extraction chromatographic resin contains a liquid stationary phase that includes an equimolar mixture of di-n-amyl-n-amylphosphonate ("DA[AP]") and a trialkylphosphine oxide ("TRPO") sorbed onto silanized silica.

ORNL currently supplies Ac-225 as a source material for Bi-213 labeled monoclonal antibodies. It is believed that the Ac-225 is obtained from ORNL's uranium supply, which is pure uranium, by dissolving the U-233 and daughter isotope Th-229 and separating the Th-229 from the U-233. ORNL's U-233 supply is approximately forty years old and, therefore, contains a useful quantity of Th-229, about 40 grams, which subsequently decays into the Ac-225. However, since the half-life of U-233 is 1,580,000 years, only small amounts of Th-229 are generated by the decay of U-233. The Th-229 is separated from the U-233 by ion exchange chromatography. The Th-229 is retained on the ion exchange column. After the Th-229 decays to Ac-225, the Ac-225 is eluted from the ion exchange column, collected, and shipped to a customer. However, this method and quantity of parent isotopes is unable to produce sufficient amounts of Ac-225 to satisfy the current need in clinical trials.

It would be desirable to provide a method of producing alpha emitters, such as Ac-225 and Bi-213, in sufficient amounts to meet current demands for cancer therapies. In addition, it would be desirable to utilize additional unused nuclear materials, which are currently classified as nuclear waste, for research, medical diagnostics and medical treatments, including immunotherapy.

BRIEF SUMMARY OF THE INVENTION

The present invention relates to products that include actinium-225 ($^{225}$Ac) and less than about 1 microgram (μg) of iron (Fe) per millicurie (mCi) of actinium-225. The product may have a radioisotopic purity of greater than about 99.99 atomic percent (at %) actinium-225 and daughter isotopes of actinium-225, and may be formed by a method that includes providing a radioisotope mixture solution comprising at least one of uranium-233 ($^{233}$U) and thorium-229 ($^{229}$Th), extracting the at least one of uranium-233 and thorium-229 into an organic phase, substantially continuously contacting the organic phase with an aqueous phase, substantially continuously extracting actinium-225 into the aqueous phase, and purifying the actinium-225 from the aqueous phase. In some embodiments, the product may include less than about 1 nanogram (ng) of iron per millicurie (mCi) of actinium-225, and may include less than about 1 microgram (μg) of each of magnesium (Mg), Chromium (Cr), and manganese (Mn) per millicurie (mCi) of actinium-225.

In addition, the present invention relates to a method of recovering at least one daughter isotope from a radioisotope mixture. The method comprises providing a radioisotope mixture solution comprising at least one parent isotope. The radioisotope mixture solution may be formulated as an aqueous, acidic solution that comprises uranium and thorium. In one embodiment, the acidic solution may have a nitric acid concentration ranging from approximately 2 M to approximately 6 M. The radioisotope mixture solution may comprise at least one of uranium-232, uranium-233, thorium-228, thorium-229, thorium-232, and mixtures thereof. The at least one parent isotope may be extracted into an organic phase, which comprises an extractant selected from the group consisting of n-tributyl phosphate, dibutyl phosphate, di-n-amyl-n-amylphosphonate (di-n-pentyl-n-pentylphosphonate), dibutyl butyl phosphonate, butyl dibutyl phosphinate, dibutyl cyclohexyl phosphonate, dibutyl chloromethyl phosphonate, tri(4-methylpentyl-2) phosphate, butyl phosphonate, di(4-methylpentyl-2) butyl phosphonate, di(4-methylpentyl-2) isobutyl phosphonate, di(4-methylpentyl-2) propyl phosphonate, and di(2-ethylbutyl) 2-ethylbutyl phosphonate. The organic phase may also comprise a diluent selected from the group consisting of benzene, carbon tetrachloride, isopropyl ether, 1-octanol, 2-ethyl hexanol, 1-decanol, 1-octanoic acid, methyl isobutylketone, p-diisopropylbenzene, dodecane, n-heptane, kerosene, a normal paraffinic hydrocarbon solvent, and an isoparaffinic hydrocarbon solvent.

The organic phase comprising the extracted, at least one parent isotope may then be substantially continuously contacted with an aqueous phase, which may include from approximately 2 M nitric acid to approximately 6 M nitric acid. At least one daughter isotope is extracted into the aqueous phase and the organic phase is separated from the aqueous phase. The organic phase and the aqueous phase may be continuously contacted, extracted, and separated using an annular centrifugal contactor. The at least one daughter isotope is purified from the aqueous phase, such as by ion exchange chromatography or extraction chromatography. To purify the at least one daughter isotope, tramp organics may be removed from the aqueous phase by extracting the tramp organics with an immiscible alcohol. In one embodiment, actinium-225 is sorbed onto a diglycolamide resin, wherein the diglycolamide resin comprises a tetraalkyldiglycolamide extractant coated onto inert support particles. The at least one daughter isotope may be Ac-225, Bi-213, Ra-225, or mixtures thereof. The purified daughter isotopes may be allowed to decay to produce subsequent daughter isotopes.

The present invention also relates to a liquid-liquid extraction system for recovering at least one daughter isotope from a radioisotope mixture. The liquid-liquid extraction system comprises a first vessel configured to separate an organic phase from a first aqueous phase for extraction of at least one parent isotope, such as uranium or thorium, from the first aqueous phase into the organic phase. A second vessel may be operatively coupled to the first vessel to receive the organic phase including the extracted at least one parent isotope therefrom and is configured to substantially continuously contact the organic phase with a second aqueous phase to extract at least one daughter isotope from the organic phase into the second aqueous phase and separate the organic phase from the second aqueous phase including the extracted at least one daughter isotope. The first vessel and the second vessel may each comprise an annular centrifugal contactor. A separation column configured to purify the at least one daughter isotope from the second aqueous phase may be operatively coupled to the second vessel to purify the at least one daughter isotope from the second aqueous phase. The at least one daughter isotope may be Ac-225, Bi-213, Ra-225, or mixtures thereof.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

A method of recovering at least one daughter isotope of interest from a mixture of radioisotopes is disclosed. The daughter isotope of interest may be at least one of Ac-225, Bi-213, radium-225 ("Ra-225"), and mixtures thereof. The radioisotope mixture may include two or more radioisotopes, with at least one of the radioisotopes being a parent isotope. As used herein, the term "parent isotope" refers to a radioisotope that is capable of undergoing radioactive decay to the daughter isotope of interest. For the sake of example only, the parent isotope is U or Th. As used herein, the term "daughter isotope" refers to a first or subsequent decay product isotope that is generated from the parent isotope. As such, the term "daughter isotope" also encompasses a subsequent decay product generated from a first decay product isotope.

The radioisotope mixture may be a breeder reactor fuel that includes, but is not limited to, U-233, U-232, Th-228, Th-229, Th-232, and mixtures thereof. The radioisotope mixture may also include Ac-225. A U-233 stockpile in the form of unirradiated Th-232/U-233 breeder reactor fuel is currently stored at the INEEL. Fresh breeder reactor fuel may include a small amount of U-233 that is required to go critical or sustain a fission process. The fresh breeder reactor fuel may include approximately 3% U-233 and approximately 97% Th-232. The Th-232 is present in the breeder reactor fuel as a target for neutron capture to produce more U-233. Since Th-229 decays from U-233, the Th-229 is diluted into a large mass of Th-232, which may only be separated by isotopic enrichment methods and not by chemical methods. The breeder reactor fuel at the INEEL is about forty years old and, therefore, may include approximately 40 grams of Th-229. Irradiated light water breeder reactor ("LWBR") fuel, which includes Th-229, may also be used as the radioisotope mixture. Since the LWBR fuel includes fission products, the LWBR fuel may first be processed in a facility that is sufficiently shielded to produce an organic phase loaded with the parent isotopes, which is then further processed as described below.

Figure 1:
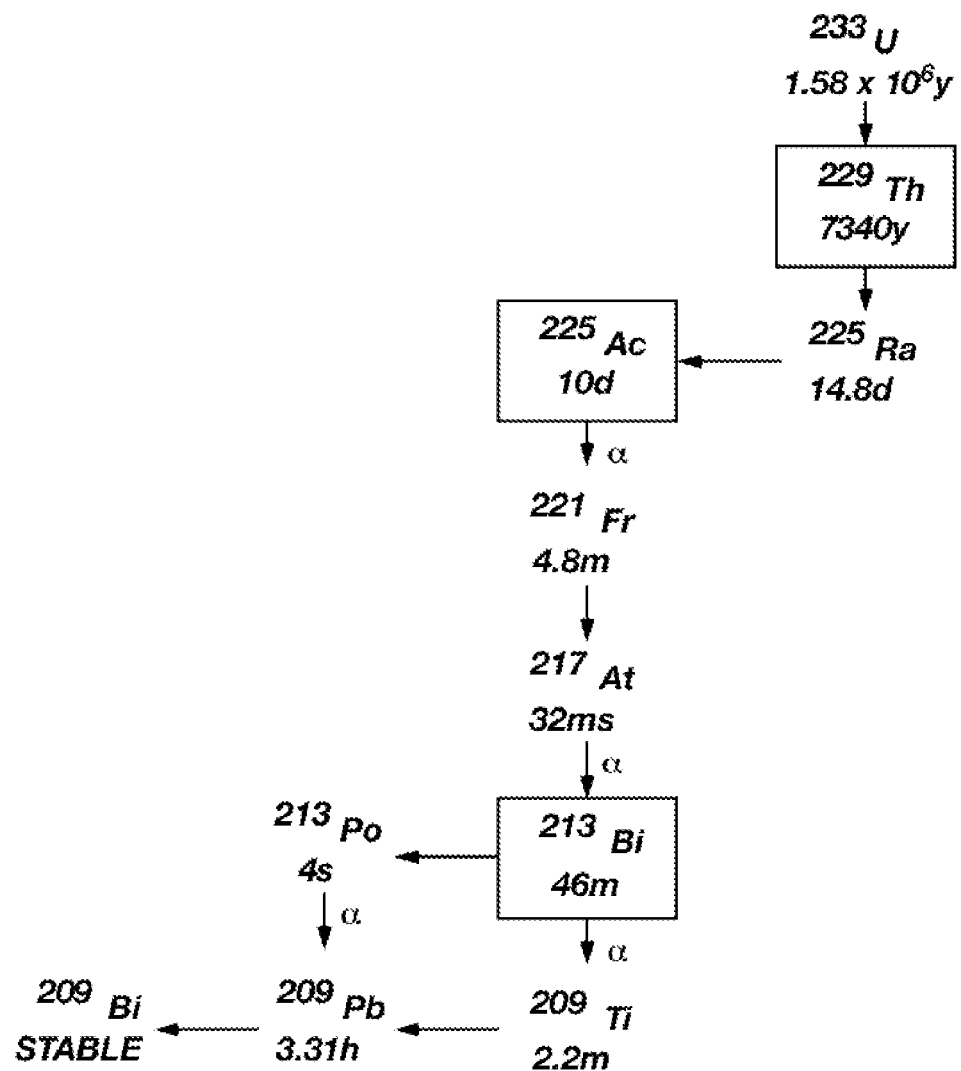
FIG. 1 shows a radioactive decay chain of U-233 to Bi-209. Half-lives of the radioisotopes are indicated in years (y), days (d), hours (h), minutes (m), seconds (s), or milliseconds (ms)

In the unirradiated breeder reactor fuel, radioisotopes of the U and the Th are the parent isotopes while radioisotopes of Ac and Bi are the daughter isotopes. As shown in FIG. 1, U-233 decays to Th-229, which subsequently decays to daughter isotopes that include Ac-225 and Bi-213. Bi-213 is an alpha and beta emitter that has a half-life of approximately 46 minutes. A Bi-213 daughter isotope, Po-213, rapidly undergoes further alpha decay to form lead-209 ("Pb-209"), which further beta decays to form bismuth-209 ("Bi-209"). Bi-209 is a stable radioisotope and, therefore, Bi-213 is a highly desired radioisotope for use in treating cancers. Since approximately 13,000 kg of the unirradiated breeder reactor fuel described above is currently stored at the INEEL, an adequate supply of the U parent isotopes is available to generate sufficient amounts of Ac-225 and Bi-213. The radioisotope mixture is stably stored at the INEEL in an oxide form as U/Th oxide fuel pellets. The U/Th oxide fuel pellets are present in a variety of pellet sizes, such as pellets having a length of about 0.5 inch and a diameter of about 0.5 inch.

Since the radioisotope mixture is present in a solid form, the radioisotope mixture may be dissolved in an acidic solution, forming an aqueous solution of the radioisotope mixture. The radioisotope mixture solution, in which the parent isotopes are dissolved, may have a nitric acid concentration ranging from approximately 2 M to approximately 6 M, such as from approximately 3 M to approximately 5 M. In one embodiment, the nitric acid concentration of the radioisotope mixture solution is approximately 3 M. The nitric acid concentration of the radioisotope mixture solution may be adjusted to maximize extraction of the parent isotopes present in the radioisotope mixture solution into an organic phase, as described in detail below. The radioisotope mixture solution may also include a catalyst, such as hydrofluoric acid, to increase the dissolution rate of the radioisotope mixture. The catalyst may be present in the radioisotope mixture solution from approximately 0.01 M to approximately 0.05 M. To complex any free fluoride that is present after dissolving the radioisotope mixture, aluminum or boron may also be present in the radioisotope mixture solution.

The radioisotope mixture solution may be intermittently or continually mixed to increase the dissolution of the radioisotope mixture. During dissolution, the radioisotope mixture solution may be maintained at a temperature ranging from approximately ambient temperature (25° C.) to approximately 300° C., such as from approximately 100° C. to approximately 175° C. In one embodiment, the radioisotope mixture is substantially dissolved in the acidic solution. However, it is also contemplated that the radioisotope mixture solution may be treated, such as by filtering, to remove any of the radioisotope mixture that is not completely dissolved in the acidic solution.

Figure 2:
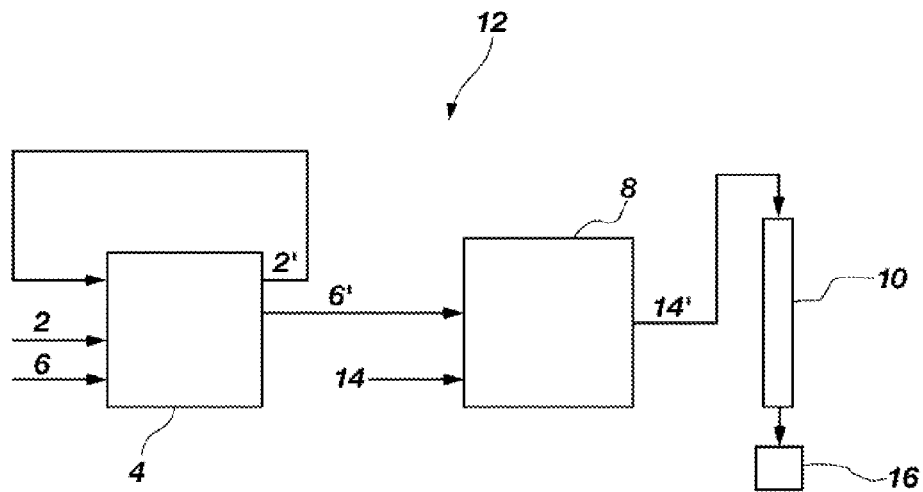
FIGS. 2 and 3 are block diagrams illustrating embodiments of systems and methods of recovering Ac-225 according to the present invention.

After dissolving the radioisotope mixture, the radioisotope mixture solution may be subjected to a liquid-liquid extraction in a first vessel 4, as shown in FIG. 2. The volume of the radioisotope mixture solution may be extracted in the first vessel 4 at one time or the radioisotope mixture solution may be extracted in a batchwise fashion. The first vessel 4 may be a centrifugal separator or an annular centrifugal contactor ("ACC"), which is described in detail below. A liquid-liquid extraction system 12 used to extract the radioisotope mixture solution may include an organic phase 6 and a first aqueous phase 2 having the radioisotope mixture solution. During the liquid-liquid extraction, non-isotope impurities, daughter isotopes, and minor amounts of the parent isotopes may remain in the first aqueous phase 2 while a substantial portion of the parent isotopes may be extracted into the organic phase 6. In other words, after the extraction, organic phase 6' is enriched in the parent isotopes while the first aqueous phase 2' is depleted in the parent isotopes. The organic phase 6' and the first aqueous phase 2' may be separated from one another, as described in detail below. The first aqueous phase 2' may be further processed, such as by additional liquid-liquid extractions, to extract the remaining trace amounts of the parent isotopes, which are combined with the parent isotopes present in the organic phase 6, or to recover, isolate, and further purify the daughter isotopes of interest, such as Ac-225. The organic phase 6', which is loaded with the parent isotopes, may be subjected to an additional liquid-liquid extraction in a second vessel 8. The organic phase 6' may be transferred from a storage tank 40 (shown in FIG. 3) to the second vessel 8. The organic phase 6' may be substantially continuously contacted with at least one additional aqueous phase, such as second aqueous phase 14, to extract the daughter isotopes of interest 16 that are produced during radioactive decay of the parent isotopes. The organic phase 6' and the second aqueous phase 14', which is enriched in the daughter isotopes of interest 16, may then be separated to isolate the daughter isotopes of interest 16. The daughter isotopes of interest 16 may be continuously extracted from the organic phase 6' by substantially continuously contacting the organic phase 6' with the second aqueous phase 14. The daughter isotopes of interest 16 in the second aqueous phase 14' may then be recovered by chromatographic techniques. In one embodiment, the daughter isotopes of interest 16 are Ac-225, Bi-213, Ra-225, and mixtures thereof.

The organic phase 6 of the liquid-liquid extraction system 12 may include a solvent in which an extractant is diluted. The solvent used in the organic phase 6 may be a diluent, such as benzene, carbon tetrachloride, isopropyl ether, 1-octanol, 2-ethyl hexanol, 1-decanol, 1-octanoic acid, methyl isobutylketone, p-diisopropylbenzene, dodecane, n-heptane, kerosene, or a paraffinic or isoparaffinic hydrocarbon solvent, such as ISOPAR®L or ISOPAR®M. ISOPAR®L includes a mixture of $C_{10}$-$C_{12}$ isoparaffinic hydrocarbons and is available from Exxon Chemical Co. (Houston, Tex.). ISOPAR®M includes a mixture of isoparaffinic hydrocarbons and is available from Exxon Chemical Co. (Houston, Tex.). In one embodiment, the solvent is kerosene. In another embodiment, the solvent is ISOPAR®L. The extractant may be selected so that the parent isotope has a high extraction distribution into the organic phase 6. The extractant may be a neutral or monoacidic organophosphorus type extractant including, but not limited to, n-tributyl phosphate ("TBP"), dibutyl phosphate, di-n-amyl-n-amylphosphonate ("DA[AP]"), dibutyl butyl phosphonate ("DB[BP]"), butyl dibutyl phosphinate, dibutyl cyclohexyl phosphonate, dibutyl chloromethyl phosphonate, tri(4-methylpentyl-2) phosphate, butyl phosphonate, di(4-methylpentyl-2) butyl phosphonate, di(4-methylpentyl-2) isobutyl phosphonate, di(4-methylpentyl-2) propyl phosphonate, and di(2-ethylbutyl) 2-ethylbutyl phosphonate. Other extractants, as known in the art, may also be used. The extractant may be present in the organic phase 6 from approximately 0.5 M to approximately 2.0 M. In one embodiment, the extractant is DA[AP] and is present in the organic phase 6 at approximately 1.0 M.

The first aqueous phase 2 may include the radioisotope mixture solution, in which the radioisotope mixture is dissolved in the acidic solution. The first aqueous phase 2 may have a nitric acid concentration ranging from approximately 2 M to approximately 6 M, such as from approximately 3 M to approximately 5 M.

When the organic phase 6 and the first aqueous phase 2 are combined, the parent isotopes may be extracted into the organic phase 6 of the liquid-liquid extraction system 12 with good efficiency. In other words, the parent isotopes may have high extraction distributions into the organic phase 6. For instance, the forward extraction distributions of U-233 and Th-229 into 1 M DA[AP] in kerosene from 2 M nitric acid are 295 and 70.5, respectively. As used herein the terms "forward extract," "forward extracted," or "forward extraction" refer to removing or extracting the U-233 and Th-229 from the first aqueous phase 2 into the organic phase 6. Extraction distributions or distribution coefficients may be calculated as known in the art. A higher distribution coefficient indicates a higher removal efficiency for the ion. At a higher nitric acid concentration, such as at 3 M nitric acid, the forward extraction distributions may be slightly higher. Conversely, the daughter isotopes of interest 16 may have low extraction distributions in the organic phase 6, such as less than 0.1. The first aqueous phase 2 may be extracted with the organic phase 6 until a sufficient loading of the parent isotopes is obtained in the organic phase 6'. Extraction of the organic phase 6 with the first aqueous phase 2 may be performed for from approximately 8 hours to approximately 10 hours to obtain the sufficient loading.

The organic phase 6', which is enriched in the parent isotopes, may then be transferred to the second vessel 8. Over time, the parent isotopes may decay into daughter isotopes, including the daughter isotopes of interest 16. To isolate the daughter isotopes of interest 16, the organic phase 6' may be extracted on a continuous basis with a fixed volume of the second aqueous phase 14. For instance, the organic phase 6' may be substantially continuously contacted with the second aqueous phase 14. The daughter isotopes of interest 16 may have high extraction distributions into the second aqueous phase 14. As such, the second aqueous phase 14 may become enriched in the daughter isotopes of interest 16 while the organic phase 6' is depleted of the daughter isotopes of interest 16. The organic phase 6' may be continuously extracted with the second aqueous phase 14 until a sufficient loading of the daughter isotopes of interest 16 is obtained in the second aqueous phase 14 to produce a daughter isotope loaded second aqueous phase 14'. Alternatively, once the organic phase 6 is sufficiently enriched or loaded with the parent isotopes (becoming the organic phase 6'), the organic phase 6' may be extracted on a continuous basis with the second aqueous phase 14 in the same vessel.

The second aqueous phase 14 may be an acidic solution, such as a nitric acid solution. The nitric acid solution may have a nitric acid concentration ranging from approximately 2 M to approximately 6 M, such as from approximately 3 M to approximately 5 M. The acidity of the second aqueous phase 14 may be adjusted to achieve optimal distribution of the daughter isotopes of interest 16 into the second aqueous phase 14 while the parent isotopes remain in the organic phase 6'.

In order to substantially continuously respectively contact the organic phase 6 with the first aqueous phase 2 or the organic phase 6' with the second aqueous phase 14, each of the vessels in which the liquid-liquid extraction is performed may be an annular centrifugal contactor ("ACC"). In other words, a first ACC may be used as the first vessel 4 to substantially continuously contact the organic phase 6 and the first aqueous phase 2. In addition, a plurality of ACC's that are configured in series may be utilized to achieve sufficient loading of the organic phase 6 with the parent isotopes. Once the organic phase 6 is sufficiently enriched or loaded with the parent isotopes, contact may be stopped between the first aqueous phase 2 and the organic phase 6. The first aqueous phase 2 and the organic phase 6' may then be separated. The first ACC may also be used to separate the parent isotope loaded organic phase 6' from the first aqueous phase 2. The same ACC, i.e., the first ACC, may then be utilized as the second vessel 8 to substantially continuously contact the organic phase 6' phase 6' with second aqueous phase(s) 14. Alternatively, a second ACC may be used as the second vessel 8 to substantially continuously contact the parent isotope loaded organic phase 6' and the second aqueous phase 14. The second vessel 8 may also be used to separate the organic phase 6' from the daughter isotope loaded second aqueous phase 14'.

Figure 4:
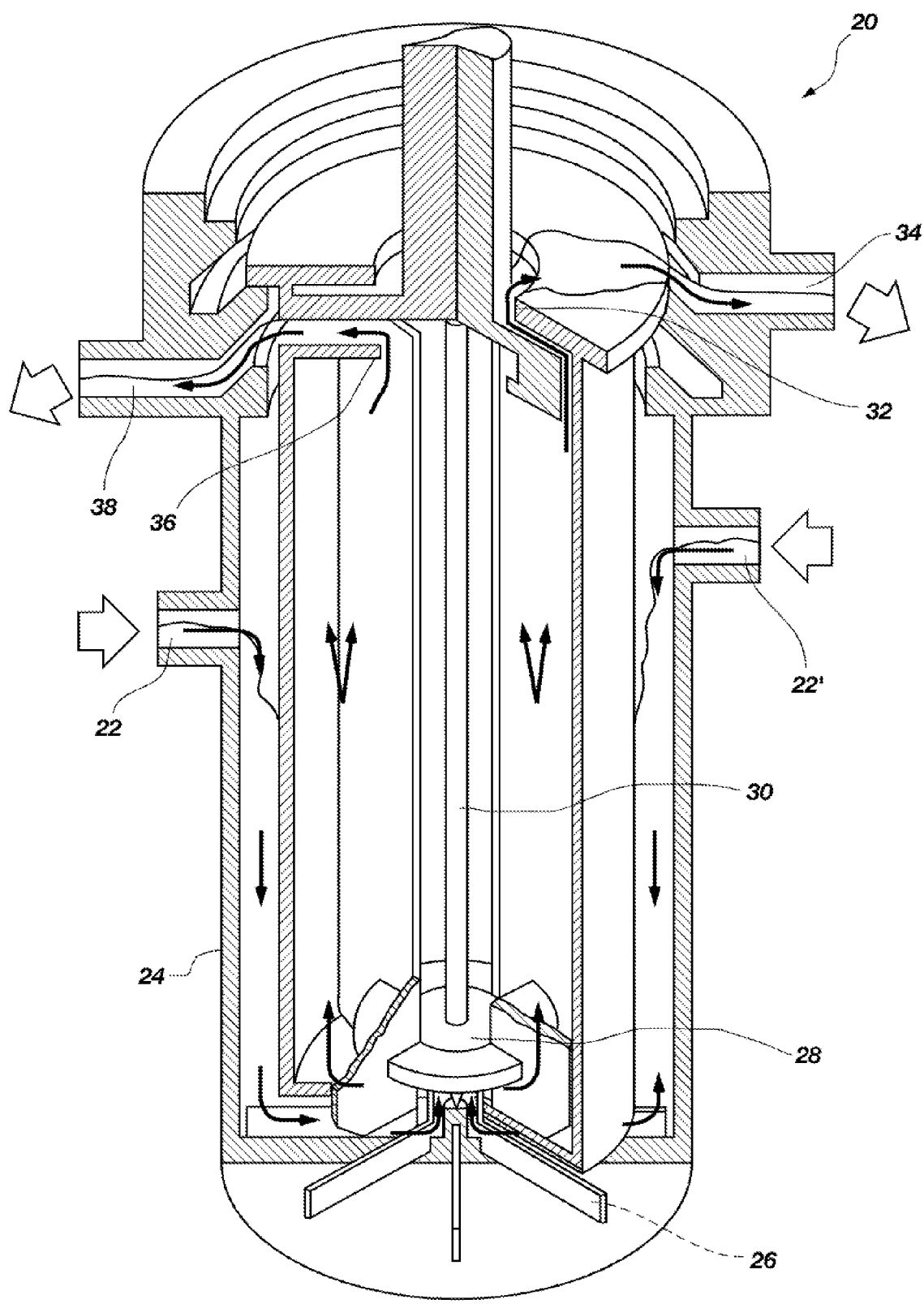
FIG. 4 is a schematic illustration of an annular centrifugal contactor ("ACC")

The ACC is known as a "contactor" because it enables the organic phases and the aqueous phases to be brought into intimate contact with one another. ACCs are commercially available, such as from Costner Industries Texas LP (Houston, Tex.), and provide a high throughput method of performing the liquid-liquid extraction. The ACC is configured to be able to substantially continuously contact organic phases and aqueous phases and to be able to mix and separate the organic and aqueous phases in a single device. As such, the ACC may enable the process of the present invention to be automated and utilize very little operator involvement. Examples of ACCs include those described in U.S. Pat. Nos. 5,571,070 and 5,591,340 to Meikrantz et al. and U.S. Pat. No. 4,959,158 to Meikrantz, the disclosures of each of which are incorporated by reference herein. As shown in FIG. 4, the organic phase 6 and the first aqueous phase 2 may be introduced into the ACC 20 through inlet ports 22, 22'. The organic phase 6 and the first aqueous phase 2 may be separately introduced through the inlet ports 22, 22' or may be introduced as a mixed phase through the inlet ports 22, 22'. The organic phase 6 and the first aqueous phase 2 are introduced to a mixing zone of the ACC 20 and migrate downward to a floor of housing 24 of the ACC 20. Radial vanes 26 direct the organic phase 6 and the first aqueous phase 2 into an interior of a hollow rotor 28. Centrifugal force of rotation of the hollow rotor 28 forces the more dense phase, typically the first aqueous phase 2, outward against a wall of the hollow rotor 28. The less dense phase, typically the organic phase 6, is displaced radially inwardly towards toward a shaft 30 of the hollow rotor 28. The organic phase 6 flows over weir 36 and is collected in a channel from which it exits the ACC 20 at outlet port 38. The first aqueous phase 2 flows over weir 32 and into a collector, from which it exits at outlet port 34. After exiting the ACC 20, each of the organic phase 6 or the first aqueous phase 2 may be reintroduced into the ACC 20 to enable the organic phase 6 and the first aqueous phase 2 to be substantially continuously contacted with one another. Alternatively, the organic phase 6' may be collected if sufficient loading of the parent isotopes has been achieved. While the flow of the organic phase 6 and the first aqueous phase 2 through the ACC 20 has been described in detail herein, a similar manner may be used to flow the organic phase 6' and the second aqueous phase 14 through the ACC 20 and collect daughter isotope loaded second aqueous phase 14'.

Depending on the stage of the liquid-liquid extraction process, an ACC 20 may be operated until sufficient loading of the parent isotope is obtained in the organic phase 6 to result in parent isotope loaded organic phase 6' or until sufficient loading of the daughter isotopes of interest 16 is obtained in the second aqueous phase 14 to result in daughter isotope loaded second aqueous phase 14'. The ACC 20 may be used to separate the organic phase 6' enriched in the parent isotopes from the first aqueous phase 2 or may be used to separate the second aqueous phase 14' enriched in the daughter isotopes of interest 16 from the organic phase 6'.

The second aqueous phase 14', into which the daughter isotopes of interest 16 are extracted, may be periodically taken offline or removed from the liquid-liquid extraction system 12, such as when sufficient loading of the daughter isotopes of interest 16 in the second aqueous phase 14' is achieved. To achieve the sufficient loading, the continuous extraction of the organic phase 6' with the second aqueous phase 14 may be performed for at least approximately 30 days and up to a maximum of approximately 100 days. The second aqueous phase 14' may be replaced with an equal volume of a third aqueous phase (not shown) in the liquid-liquid extraction system 12. The third aqueous phase may be in substantially continuous contact with the organic phase 6' to continue extracting additional daughter isotopes of interest 16 from the organic phase 6' while the second aqueous phase 14' is processed to recover the daughter isotopes of interest 16, as described below. The third aqueous phase may be an acidic solution, such as an acidic solution similar to that used as the second aqueous phase 14. After the daughter isotopes of interest 16 have been removed from the second aqueous phase 14', the third aqueous phase may be taken offline and processed to remove the daughter isotopes of interest 16 while the second aqueous phase 14', which is now depleted of the daughter isotopes of interest 16, may be used in the liquid-liquid extraction system 12.

Figure 3:
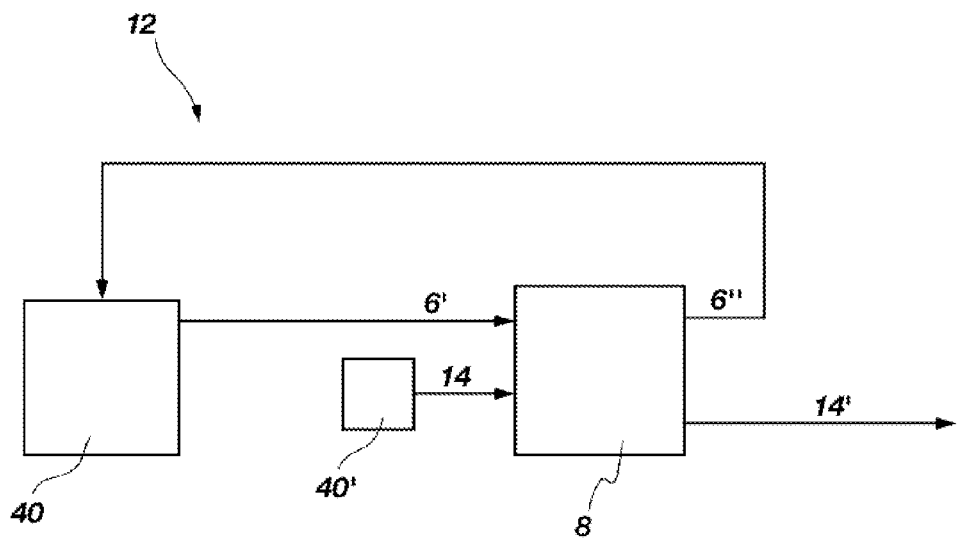

In one embodiment, the organic phase 6' is transferred from the storage tank 40 to the second vessel 8, as shown in FIG. 3. The storage tank 40 may hold a volume of approximately 210,000 L of the organic phase 6', which may include the parent isotopes, 73,000 kg of 1 M DA[AP], and ISOPAR®L. The organic phase 6' may be substantially continuously contacted with the second aqueous phase 14 to extract the daughter isotopes of interest 16 (FIG. 2) into the second aqueous phase 14, producing the second aqueous phase 14', which is enriched in the daughter isotopes of interest 16. For the sake of example only, the second vessel 8 may be a 41 cm ACC having a throughput of approximately 175 L/min. As previously described, the second aqueous phase 14 may be a nitric acid solution having a nitric acid concentration of 3 M. The second aqueous phase 14 may be stored in storage tank 40'. The storage tank 40' may hold a volume of approximately 300 L of the second aqueous phase 14. After the extraction, the organic phase 6' is depleted of the daughter isotopes of interest 16, becoming organic phase 6", which may be recirculated to the storage tank 40. The parent isotopes in the organic phase 6" may further decay into the daughter isotopes of interest 16, which may be extracted in a similar manner. The second aqueous phase 14' enriched in the daughter isotopes of interest 16 may be processed by chromatographic techniques, as described below. The second aqueous phase 14' may also include small amounts of the parent isotopes (Th-232 and U-233), radium-224 ("Ra-224"), radium-228 ("Ra-228"), and stable metal ion impurities.

Before recovering the daughter isotopes of interest 16, tramp organics may be removed from the second aqueous phase 14'. The tramp organics are residues of dissolved and dispersed solvents, such as hydrocarbon solvents, and extractant degradation products that are used or found in the organic phase 6. During the extraction process, small amounts of the hydrocarbon solvents may undesirably be extracted into the second aqueous phase 14'. The tramp organics may be removed from the second aqueous phase 14' using the Argonne Alcohol Extraction ("ARALEX") process. The ARALEX process is an extraction process that utilizes an immiscible alcohol, such as 2-ethyl-1-hexanol, to remove the residual hydrocarbon solvents from the second aqueous phase 14'. Removal of the tramp organics may enable better separation performance of the second aqueous phase 14' on separation column 10 when recovering the daughter isotopes of interest 16 (FIG. 2). Removal of the tramp organics may also protect subsequent separation columns 10 from degradation and overloading.

The second aqueous phase 14', which is enriched in the daughter isotopes of interest 16, may be processed by a variety of chromatographic techniques to remove, purify, and concentrate the daughter isotopes of interest 16. The second aqueous phase 14' may also be processed to remove minor amounts of the parent isotopes that remain in the second aqueous phase 14' and other undesired compounds, such as undesired daughter isotopes. The chromatographic techniques may include ion exchange chromatography, such as cation exchange chromatography or anion exchange chromatography, and extraction chromatography. Resins that may be used include, but are not limited to, DOWEX® 1×8 resin, which is available from Dow Corning Corp., (Michigan, U.S.A.); TEVA™ resin, which is a tetravalent actinide resin having a quaternary ammonium salt (a mixture of trioctyl and tridecyl methyl ammonium chlorides) sorbed on a water-insoluble support and is available from Eichrom Industries, Inc. (Darien, Ill.); DIPEX® resin, which has diphosphonic acid ("DPA") groups sorbed onto an inert substrate and is available from Eichrom Industries; DIPHOSIL™ resin, which is available from Eichrom Industries, Inc.; DIPHONIX® resin, which is available from Eichrom Industries, Inc.; UTEVA® or UTEVA®-2 resin, which has DA[AP] as the extractant and a TRPO sorbed onto silanized silica and is available from Eichrom Industries, Inc.; a diglycolamide ("DGA") resin having a tetraalkyldiglycolamide as the extractant that is coated on inert support particles; and 2-ethylhexyl-2-ethylhexylphosphonic acid on an inert substrate. Each of these resins may be packed into a column, such as separation column 10.

For instance, a DGA resin may be used to remove the daughter isotopes of interest 16, such as Ac-225, from the second aqueous phase 14'. The DGA resin may include a tetraalkyldiglycolamide, such as N,N,N', N'-tetra-N-alkyl-3-oxopentanediamide ("TN-DGA"), N,N,'N', N'-tetra-n-octyl diglycolamide ("TO-DGA"), the branched alkyl N,N,N', N'-tetra-(2-ethyl hexyl)-3-oxopentanediamide ("TB-DGA"), other tetraalkyldiglycolamides, or mixtures thereof, which is coated on inert support particles. The DGA resin may be a TO-DGA resin or a TB-DGA resin, which are each available from Eichrom Industries. Inc. The inert, porous support may include polymeric resins or silica particles. When the second aqueous phase 14' contacts the DGA resin, the Ac-225 may be sorbed to the DGA resin while the parent isotopes or the undesired daughter isotopes, such as Ra-224 or Ra-225, elute from the DGA resin. The daughter isotopes of interest 16 may subsequently be eluted from the DGA resin by contacting the DGA resin with water, dilute (less than approximately 0.1 M) hydrochloric acid, or dilute (less than approximately 0.1 M) nitric acid.

The second aqueous phase 14' may be flowed through the separation column 10 that is packed with the ion exchange resin or the extraction resin. The separation column 10 may bind the daughter isotopes of interest 16 while allowing the parent isotopes or the undesired daughter isotopes to elute. For instance, a DGA column may be used to bind the Ac-225 while other components of the second aqueous phase 14' elute. Alternatively, the separation column 10 may bind the parent isotopes or the undesired daughter isotopes while allowing the daughter isotopes of interest 16 to elute. For instance, trace amounts of the U and Th parent isotopes remaining in the second aqueous phase 14' may be removed by passing the second aqueous phase 14' through an extraction column that binds the U and Th parent isotopes while the Ac-225 elutes. The extraction column may be a UTEVA®-2 resin. Similarly, if the second aqueous phase 14' includes undesired daughter radioisotopes, such as Ra-225, the second aqueous phase 14' may be passed through an ion exchange column to bind the Ac-225 while the Ra-225 elutes. The Ra-225 that elutes may be collected and stored for a sufficient amount of time to decay to Ac-225, at which time the Ac-225 may be processed as previously described. Various combinations of chromatographic techniques, such as using different types of chromatographic resins, may be used to purify and concentrate the Ac-225.

Each of the above-described resins may be packed into separation columns, as known in the art. Chromatographic conditions, such as flow rates and mobile phases, used to separate the daughter isotopes of interest 16 from the second aqueous phase 14' may be selected by one of ordinary skill in the art and, as such, are not discussed in detail herein.

Figure 5:
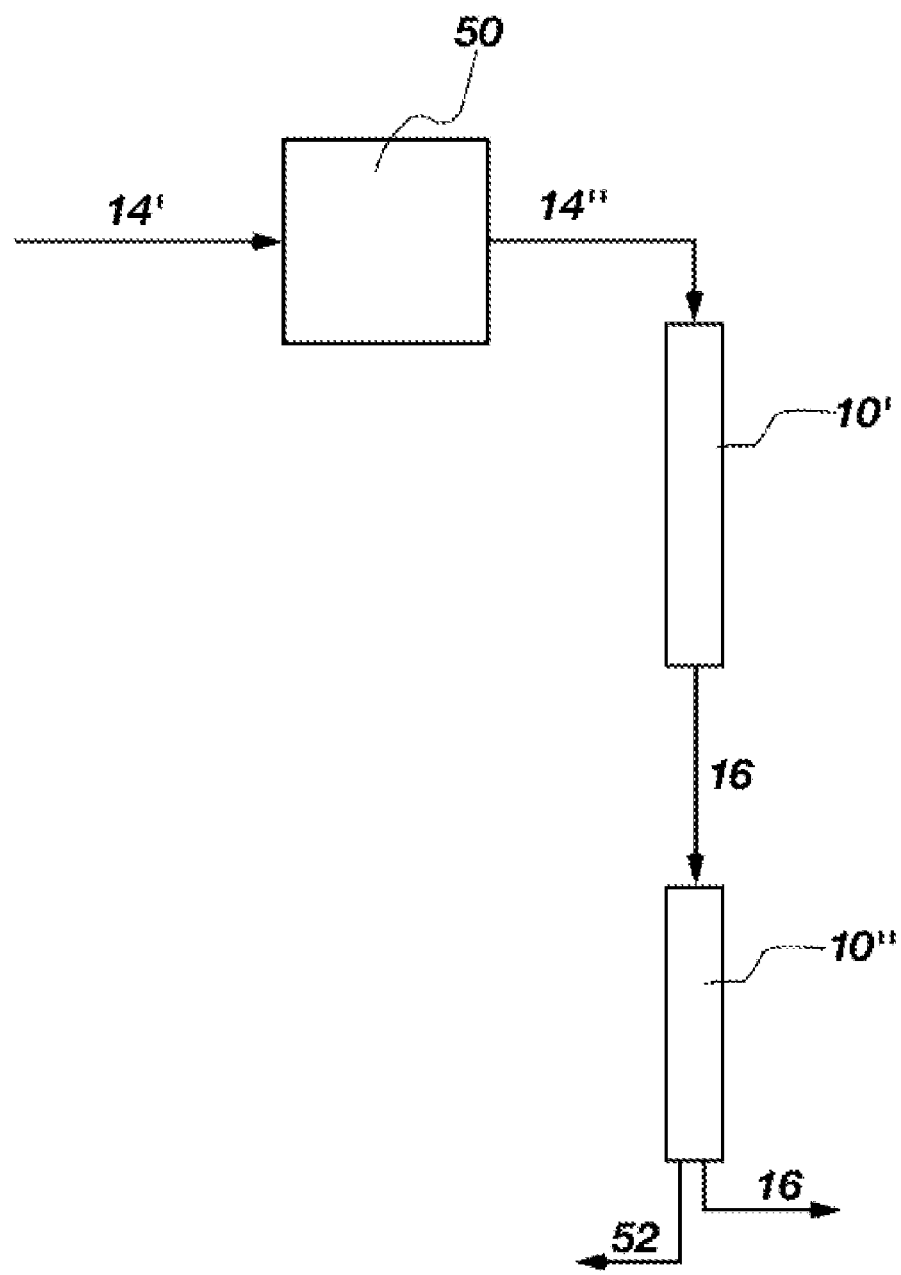
FIG. 5 is a block diagram illustrating an embodiment of a system and method of recovering Ac-225 according to the present invention.

In one embodiment, the daughter isotopes of interest 16 may be removed, purified, and concentrated from the second aqueous phase 14' by passing the second aqueous phase 14' through various separation columns 10. However, before purifying the second aqueous phase 14', the tramp organics may be removed by introducing the second aqueous phase 14' into a contactor, such as ACC 50, as shown in FIG. 5. The ACC 50 may be a 5 cm or 12.5 cm ACC. The tramp organics may be removed using the ARALEX process, as previously described. Second aqueous phase 14" exiting from the ACC 50 may be substantially free of tramp organics. The second aqueous phase 14" may be passed through separation column 10', which is packed with the UTEVA® or the UTEVA®-2 resin. The separation column 10' may have a bed volume ranging from approximately 1 L to approximately 2 L. The separation column 10' may bind the U and Th parent isotopes while the daughter isotopes of interest 16, such as the Ac-225, elute. In one embodiment, the UTEVA®-2 resin is used in the separation column 10' because the UTEVA®-2 resin is able to remove more parent isotopes than the UTEVA® resin. The daughter isotopes of interest 16 may then be passed through separation column 10", which is packed with the DGA resin. The separation column 10" may have a bed volume of approximately 100 ml. The daughter isotopes of interest 16 may bind to the DGA resin in the separation column 10" while undesired daughter isotopes 52, such as Ra-224 or Ra-225, elute. To elute the daughter isotopes of interest 16 from the separation column 10", a 0.1 M $HNO_3$ solution may be passed through the separation column 10". The daughter isotopes of interest 16 may elute in a smaller volume, such as approximately 100 ml. To further reduce the volume in which the recovered daughter isotopes of interest 16 are present, the recovered daughter isotopes of interest 16 may be processed through small separation columns 10', 10" loaded with UTEVA® resin, UTEVA®-2 resin, or DGA resin. These separation columns 10', 10" may each have a bed volume of approximately 10 ml.

The volume of the second aqueous phase 14' may be processed through the separation columns 10 at one time or may be processed batchwise. After the volume of the second aqueous phase 14' has been processed, the daughter isotopes of interest 16 may be recovered from the separation column 10. For instance, if the daughter isotopes of interest 16 are bound to the separation column 10, the daughter isotopes of interest 16 may be eluted using an acidic solution, such as a nitric acid or hydrochloric acid solution, and collected. The acidic solution may have an acid concentration that ranges from approximately 0.001 M to approximately 6 M. In one embodiment, the daughter isotopes of interest 16 are stripped from the DGA column using 0.1 M nitric acid. The daughter isotopes of interest 16 that are collected from the separation column 10 may then be shipped to a customer. Alternatively, the daughter isotopes of interest 16 may be retained on the separation column 10, which serves as a storage vessel until the daughter isotopes of interest 16 are to be used. The separation column 10 may also function as a shipping vessel in which the daughter isotopes of interest 16 retained on the separation column 10 are delivered to the customer. The daughter isotopes of interest 16 may be stripped from the separation column 10 by the customer.

After elution from the separation column 10, additional purification and concentration steps may be performed to further purify and concentrate the daughter isotopes of interest 16. For instance, the nitric acid concentration of the solution including the daughter isotopes of interest 16 may be adjusted to approximately 3 M. This solution may then be reprocessed through the UTEVA®-2 column and the DGA column, as previously described.

By utilizing the method of the present invention, convenient and efficient recovery of the daughter isotopes of interest 16 may be achieved. The liquid-liquid extraction system 12 described herein may have a recovery efficiency of at least approximately 90%. In contrast, the precipitation process described in Tranter has a recovery efficiency of approximately 40% to approximately 60%. Since the daughter isotopes of interest 16 are continuously removed from the organic phase 6', the organic phase 6' is not stored to allow the parent isotopes to decay before performing the liquid-liquid extraction. In addition, by continuously removing the daughter isotopes of interest 16, the radiation dose on the organic phase 6' may be reduced, which increases the stability of the organic phase 6'. Furthermore, the liquid-liquid extraction may be repeated numerous times as the daughter isotopes of interest 16 decay from the long-lived parent isotopes. Since the parent isotopes continually generate decay products that include the daughter isotopes of interest 16, the organic phase 6' may be contacted with the second aqueous phase 14' on a continuous basis to extract the daughter isotopes of interest 16. In addition, since the U-233 is not separated from the thorium isotopes during the liquid-liquid extraction, continued decay of the U-233 produces additional quantities of Th-229 that are available as the parent isotopes. Furthermore, no additional safeguard issues are raised with the method of the present invention.

Since the daughter isotopes of interest 16 that are eluted from the separation column 10 include Ac-225, the method of the present invention may provide a sufficient supply of Ac-225 for use in labeling monoclonal antibodies. Additionally, since the Ac-225 decays to Bi-213, the Ac-225 may be used as a parent isotope of Bi-213, providing a sufficient supply of Bi-213 for use in labeling monoclonal antibodies. Since Bi-213 has a short half-life, the Bi-213 may be quickly extracted from the Ac-225 source and administered to a patient.

Furthermore, the methods for recovering daughter isotopes of interest 16 from radioisotope mixtures described herein may provide daughter isotope products of higher purity relative to those obtainable using known methods for at least two reasons. First, the chromatographic techniques described herein for removing, purifying, and concentrating the daughter isotopes of interest 16 from the second aqueous phase 14' utilize separation mediums that may have a higher selectively for the particular daughter isotopes of interest 16 relative to conventional ion exchange resins used in separation columns. For example, conventional ion exchange resins may exhibit a relatively low degree of selectivity between ions having equal valence or charge. The extraction chromatography resins described herein may exhibit relatively high selectively for the daughter isotopes of interest 16 relative to other ion impurities including, for example, calcium, magnesium, chromium, manganese, and iron. The selectivity of these extraction chromatography resins may be at least partially a function of atomic size and possibly other factors, in addition to valence or charge. As such, by using methods described herein, daughter isotope products may be produced having purity levels previously unattainable.

Furthermore, the methods for recovering daughter isotopes of interest 16 from radioisotope mixtures described herein may be performed with minimal numbers of evaporation or other volume reduction processes (i.e., as little as one, or even none). Many previously known methods for recovering daughter isotopes of interest 16 from radioisotope mixtures require multiple evaporations, each of which may increase the concentration of impurities in the daughter isotope product.

By way of example and not limitation, the methods for recovering daughter isotopes from radioisotope mixtures described herein may be used to provide radioisotope products that have a radioisotopic purity of greater than about 99.99% Ac-225 and daughter isotopes of Ac-225. In other words, greater than about 99.99% of the radionuclides in such products may be Ac-225 ($^{225}$Ac) and daughter isotopes of Ac-225 ($^{225}$Ac). Furthermore, such products may have less than about 1 microgram (μg) of iron (Fe) per millicurie (mCi) of actinium-225 ($^{225}$Ac). More particularly, such products may have less than about 1 nanogram (ng) of iron (Fe) per millicurie (mCi) of actinium-225 ($^{225}$Ac). In addition such products may have less than about 10 micrograms (μg) of calcium (Ca) per millicurie (mCi) of actinium-225 ($^{225}$Ac). More particularly, such products may have less than about 1 microgram (μg) of calcium (Ca) per millicurie (mCi) of actinium-225 ($^{225}$Ac). Moreover, such products may have less than about 1 microgram (μg) of each of magnesium (Mg), chromium (Cr), and manganese (Mn) per millicurie (mCi) of actinium-225 ($^{225}$Ac). More particularly, such products may have less than about 1 nanogram (ng) of each of magnesium (Mg), chromium (Cr), and manganese (Mn) per millicurie (mCi) of actinium-225 ($^{225}$Ac).

Moreover, by increasing the purity of the daughter isotope products, and particularly the purity of the daughter isotope products with respect to iron (Fe), the utility of the daughter isotope products for chelation with monoclonal antibodies for use in medical therapies may also be increased. As known in the art, bi-functional diethylenetriaminepentaacetate (DTPA) derivatives are typically used as ligands for the attachment of bismuth-213 to antibodies. However, the equilibrium constant of $Fe^{+3}$ with DTPA ligands exceeds that of $Bi^{+3}$. Therefore, by decreasing the amount of iron (Fe) present in the daughter isotope products, the efficiency by which antibodies chelated with daughter isotope products may be produced may also be increased.

The present invention also relates to methods of treating a cancer in a patient. As used herein, a "patient" refers to any warm-blooded animal, preferably a human. The cancer may be treated by administering an effective dose of the high purity isotopes of the present invention along with a pharmaceutically acceptable carrier to the patient. The cancers that may be treated by this method include acute myeloid leukemia, metastatic cancers, and other cancers. A cancer may be diagnosed using criteria generally accepted in the art, including the presence of a malignant tumor. Pharmaceutical compositions may be administered either prior to or following surgical removal of primary tumors and/or treatment, such as administration of radiotherapy or conventional chemotherapeutic drugs. Administration may be by any suitable method, including administration by intravenous, intraperitoneal, intramuscular, subcutaneous, intranasal, intradermal, anal, vaginal, topical and oral routes.

In certain configurations, treatment of the cancer may be accomplished by delivering high purity isotopes to cancerous cells in the patient. Such methods may include the steps of attaching the isotope to a carrier having a receptor with a high affinity for a marker present on the surface of the cancer cell. Such carriers may be antibodies including monoclonal and polyclonal antibodies that are selected for their affinity to bind an antigen on the surface of the cancer cell. It may be advantageous if the antigen or marker is found to be overexpressed in the cancer cells as compared to normal cells. Such antibodies may be from any warm-blooded animal including human, rodent, and chimeric antibodies. The antibodies may further be antibodies in which the Fab portion is from a non-human animal and the Fc portion is synthetically modified to present a humanized antibody.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A product including a radioisotope mixture comprising:
   a quantity of actinium-225;
   a quantity of at least one daughter isotope of actinium-225; and
   between about 1 nanogram and about 1 microgram of iron per millicurie of actinium-225.

2. The product of claim 1, wherein the product further comprises a volume of liquid, the actinium-225 being suspended in the volume of liquid.

3. The product of claim 1, wherein the product further comprises less than about 10 micrograms of calcium per millicurie of actinium-225.

4. The product of claim 3, wherein the product further comprises less than about 0.1 microgram of calcium per millicurie of actinium-225.

5. The product of claim 1, wherein the product further comprises less than about 1 microgram of each of magnesium, chromium, and manganese per millicurie of actinium-225.

6. The product of claim 5, wherein the product further comprises less than about 1 nanogram of each of magnesium, chromium, and manganese per millicurie of actinium-225.

7. The product of claim 1, wherein the product further comprises a quantity of at least one radioisotope in addition to actinium-225.

8. The product of claim 7, wherein the product has a radioisotopic purity that is greater than about 99.99 atomic percent actinium-225 and daughter isotopes of actinium-225.

9. A product including a radioisotope mixture having a radioisotopic purity of greater than about 99.99 atomic percent actinium-225 and daughter isotopes of actinium-225 and including between about 1 nanogram and about 1 microgram of iron per millicurie of actinium-225.

10. The product of claim 9, wherein the product comprises a liquid suspension.

11. The product of claim 9, wherein the product further comprises less than about 10 micrograms of calcium per millicurie of actinium-225.

12. The product of claim 11, wherein the product further comprises less than about 0.1 microgram of calcium per millicurie of actinium-225.

13. The product of claim 9, wherein the product further comprises less than about 1 microgram of each of magnesium, chromium, and manganese per millicurie of actinium-225.

14. The product of claim 13, wherein the product further comprises less than about 1 nanogram of each of magnesium, chromium, and manganese per millicurie of actinium-225.

15. The product of claim 9, wherein the product further comprises a quantity of at least one radioisotope in addition to actinium-225.

16. A product including a radioisotope mixture having a radioisotopic purity of greater than about 99.99 atomic percent actinium-225 and daughter isotopes of actinium-225 and including between about 1 nanogram and about 1 microgram of iron per millicurie of actinium-225, the product formed by a method including:
   providing a radioisotope mixture solution comprising at least one of uranium-233 and thorium-229;
   extracting the at least one of uranium-233 and thorium-229 into an organic phase;
   substantially continuously contacting the organic phase with an aqueous phase;
   substantially continuously extracting actinium-225 into the aqueous phase; and
   purifying the actinium-225 from the aqueous phase.

17. The product of claim 16, wherein the product further comprises less than about 1 microgram of each of magnesium, chromium, and manganese per millicurie of actinium-225.

* * * * *

UNITED STATES PATENT AND TRADEMARK OFFICE
CERTIFICATE OF CORRECTION

PATENT NO. : 7,736,610 B2
APPLICATION NO. : 11/278522
DATED : June 15, 2010
INVENTOR(S) : David Herbert Meikrantz et al.

Page 1 of 1

It is certified that error appears in the above-identified patent and that said Letters Patent is hereby corrected as shown below:

In the specifications:
COLUMN 9, LINE 15, change "phase 6′ phase 6‴" to --phase 6′--
COLUMN 9, LINE 50, change "towards toward" to --toward--

Signed and Sealed this
Twenty-first Day of May, 2013

Teresa Stanek Rea
*Acting Director of the United States Patent and Trademark Office*